United States Patent [19]

Sanemitsu

[11] Patent Number: 5,343,030
[45] Date of Patent: Aug. 30, 1994

[54] IC CARD HAVING FLASH ERASE MEANS

[75] Inventor: Yoshikado Sanemitsu, Itami, Japan

[73] Assignee: Mitsubishi Denki Kabushiki Kaisha, Tokyo, Japan

[21] Appl. No.: 866,488

[22] Filed: Apr. 10, 1992

[30] Foreign Application Priority Data

Apr. 12, 1991 [JP] Japan .................. 3-079391

[51] Int. Cl.$^5$ ............................ G06K 19/06
[52] U.S. Cl. ................. 235/492; 365/218; 365/900
[58] Field of Search .......... 235/492; 365/900, 230.03, 365/195, 218

[56] References Cited

U.S. PATENT DOCUMENTS

| | | | |
|---|---|---|---|
| 4,648,076 | 2/1987 | Schrenk | 365/218 |
| 4,894,804 | 1/1990 | Uchida | 365/218 |
| 4,931,997 | 6/1990 | Mitsuishi et al. | 365/218 |
| 4,970,692 | 11/1990 | Ali et al. | 365/189.03 |
| 5,097,446 | 3/1992 | Shoji et al. | 365/900 |
| 5,132,928 | 7/1992 | Hayashikoshi | 365/63 |
| 5,155,705 | 10/1992 | Goto et al. | 365/218 |
| 5,200,600 | 4/1993 | Shinagawa | 235/492 |
| 5,214,605 | 5/1993 | Lim et al. | 365/218 |
| 5,260,555 | 11/1993 | Sakamoto | 235/492 |

FOREIGN PATENT DOCUMENTS 0167827 1/1986 European Pat. Off. .
3065745 3/1991 Japan .

Primary Examiner—E. Rollins Cross
Assistant Examiner—Erick Solis
Attorney, Agent, or Firm—Leydig, Voit & Mayer

[57] ABSTRACT

A command input IC card includes a plurality of memory semiconductor elements for electrically storing and batch-erasing data and an address decoder for decoding a card signal in response to an address signal to selectively output a chip enable signal to one of the memory semiconductor elements. The operating mode of each element is determined in response to a command input from outside the IC card. The IC card also includes a command detector and a latch circuit, both of which inhibit an address decoder from decoding in response to a predetermined command. The card enable signal is thereby supplied as the chip enable signal to all the memory semiconductor elements.

5 Claims, 3 Drawing Sheets

IC CARD HAVING FLASH ERASE MEANS

BACKGROUND OF THE INVENTION

1. Field of the Invention

The present invention relates to an IC card and, more particularly, to a command input IC card having a plurality of built-in memory semiconductor elements for electrically storing and batch-erasing data.

2. Description of the Related Art

FIG. 2 is a block diagram showing the structure of the circuitry on a conventional command type IC card. Two memory semiconductor elements 2 and 3 having similar structures are connected to an address decoder 1. Each of the memory semiconductor elements 2 and 3 is a command input element that receives commands from outside the card for determining operating modes on the basis of the commands, and is capable of electrically writing and batch-erasing data. A card enable signal line 6 and a signal line 7a, one of the signal lines running through an address bus 7, are connected to the address decoder 1. The address bus 7, a read enable signal line 8, a write enable signal line 9, a data bus 10 and a program power supply line 11 are all connected to both of the memory semiconductor elements 2 and 3. The memory semiconductor element 2 is connected to the address decoder 1 by a chip enable signal line 12; similarly, the memory semiconductor element 3 is connected to the address decoder 1 by another chip enable signal line 13. The card enable signal line 6, the read enable signal line 8 and the write enable signal line 9 are pulled-up to power source voltages by resistors 16, 17 and 18, respectively.

FIG. 3 shows the inner structure of the memory semiconductor element 2. The address bus 7 is connected to a memory cell array 20 through an X address decoder 21 and a Y address decoder 22. The data bus 10 is connected to the memory cell array 20 through a data input/output circuit 24 (a data I/O circuit 24). A command latch circuit 25 is connected to the data bus 10. A control logic circuit 23 is connected to the X address decoder 21, the Y address decoder 22, the data I/O circuit 24 and the command latch circuit 25. The chip enable signal line 12, the read enable signal line 8, the write enable signal line 9 and the program power supply line 11 are all connected to the control logic circuit 23.

When data is read from the memory semiconductor element 2, the level of the chip enable signal line 12 and that of the read enable signal line 8 are both low, whereas the level of the write enable signal line 9 is high. At the same time, an ordinary supply voltage is applied to the program power supply line 11. When a desired address is specified on the address bus 7, the X and Y address decoders 21 and 22 select a memory cell corresponding to the specified address from the memory cell array 20. Data stored in this memory cell is output to the data bus 10 via the data I/O circuit 24.

When data is written, i.e., stored, or batch-erased, a program voltage is applied to the program power supply line 11, and the level of the read enable signal line 8 is made high, whereas the level of the chip enable signal line 12 and that of the write enable signal line 9 are both made low. Under these conditions, when a command is input through the data bus 10, it is retained by the command latch circuit 25. Whether data is written or batch-erased depends on the command in the command latch circuit 25.

When data is written, the level of the chip enable signal line 12 and that of the write enable signal line 9 are both low, and the level of the read enable signal line 8 is high. The data is input to the data bus 10 and is thereby written into a desired address. The level of the chip enable signal line 12 and that of the read enable signal line 8 are both low, whereas the level of the write enable signal line 9 is high. The written data is read on the data bus 10 and is verified by a predetermined algorithm.

When data is batch-erased, in the same manner as in writing, the level of the chip enable signal line 12 and that of the write enable signal line 9 are both made low, whereas the level of the read enable signal line 8 is made high. After the contents of all the memory cells in the memory array 20 have been erased, the level of the chip enable signal line 12 and that of the read enable signal line 8 are both made low, whereas the level of the write enable signal line 9 is made high. An algorithm different from that used in writing verifies batch erasure.

When the level of the chip enable signal line 12 is high, the memory semiconductor element 2 becomes inactive and does not perform any operation, regardless of the levels of the other signal lines.

In this way, to actuate the IC card, shown in FIG. 2, having the built-in memory semiconductor elements 2 and 3, a predetermined voltage is applied to the program power supply line 11, and the level of the card enable signal line 6 is made low. A card enable signal is decoded on the basis of a part of an address signal which is input to the address decoder 1 through the signal line 7a. As a result, an low level chip enable signal is output from the address decoder 1 to one of the memory semiconductor elements 2 and 3 in accordance with an address specified by the address signal. The memory semiconductor element having received the chip enable signal becomes active, thus making it possible to perform the various operations mentioned above.

The address decoder 1 makes the level of one chip enable signal line 12, connected to the memory semiconductor element 2, high, and also makes the level of the other chip enable signal line 13, connected to the memory semiconductor element 3, low, or vice versa. Therefore, when the contents stored in all the memory semiconductor elements 2 and 3 in the entire IC card are erased, the contents are erased element by element. Thus the contents stored in the IC card cannot be batch-erased. For this reason, it takes an enormous amount of time to erase the contents stored in the entire IC card.

SUMMARY OF THE INVENTION

The present invention has been accomplished to overcome this disadvantage. Accordingly, the object of the invention is to provide an IC card capable of batch-erasing the contents stored in all built-in memory semiconductor elements.

In order to achieve the above object, according to this invention, there is provided an IC card comprising: a plurality of memory semiconductor elements, responding to a command input to the IC card for electrically storing data and batch-erasing stored data; an address decoder for decoding a card enable signal in response to an address signal to selectively output a chip enable signal to one of the plurality of memory semiconductor elements; and decode inhibiting means for inhibiting the address decoder when a predetermined command is input to the IC card, whereby the card enable signal is simultaneously supplied as the chip enable signal to all the memory semiconductor elements.

In this invention, when the input command is the predetermined command, the decode inhibiting means inhibits the address decoder, whereby the card enable signal is supplied as the chip enable signal to all the memory semiconductor elements.

DESCRIPTION OF THE PREFERRED EMBODIMENT

An embodiment of the present invention will be described below with reference to the accompanying drawings.

Figure 1:
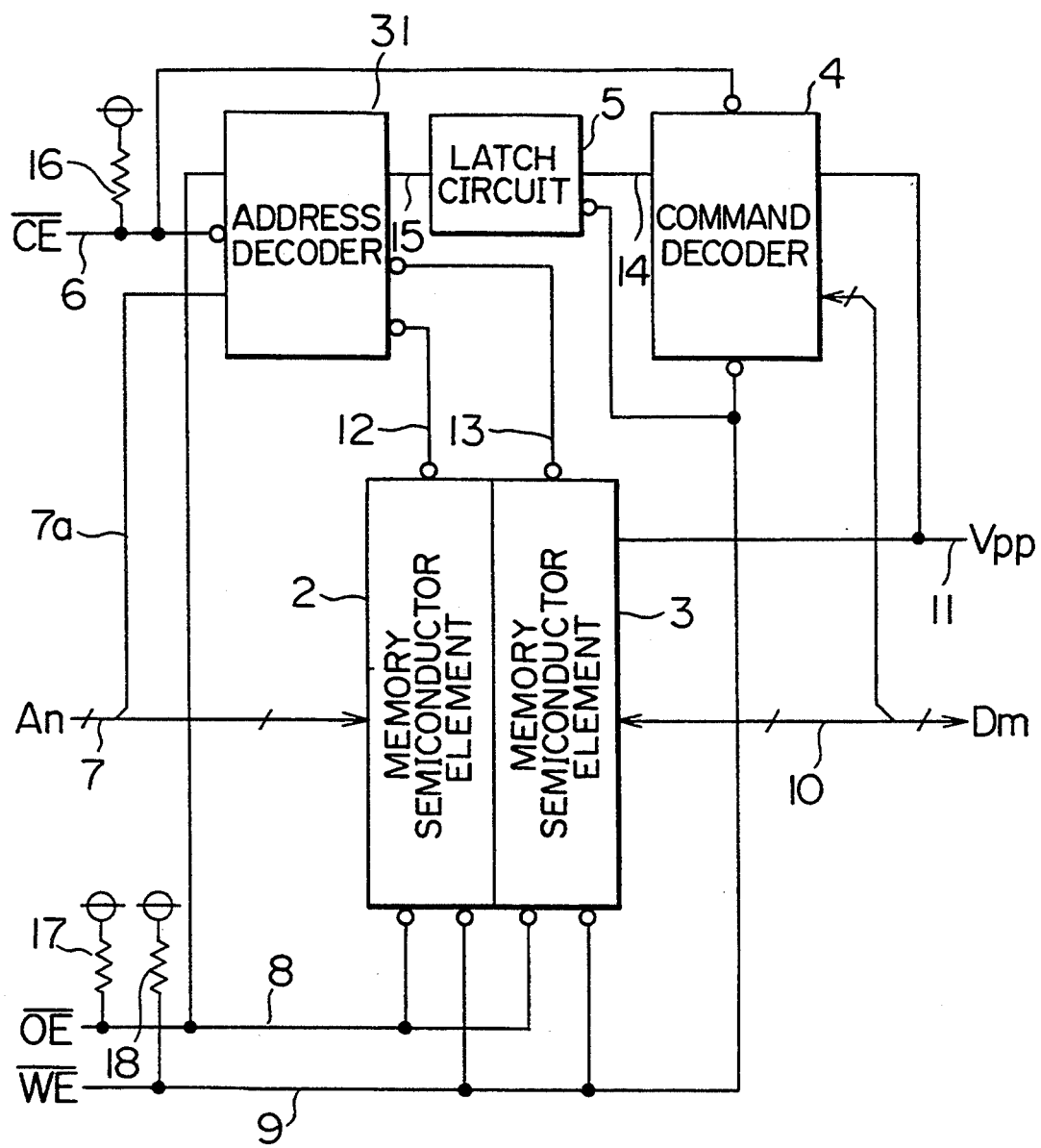
FIG. 1 is a block diagram showing the structure of the circuitry of an IC card in accordance with an embodiment of the present invention.

FIG. 1 is a block diagram showing the structure of the circuitry of an IC card in accordance with the embodiment of this invention. Two memory semiconductor elements 2 and 3, having similar structures, are connected to an address decoder 31. Each of the memory semiconductor elements 2 and 3 is a command input element that receives commands from outside the IC card for determining operating modes and is capable of electrically writing, i.e., storing, and batch-erasing data. A card enable signal line 6, a read enable signal line 8, and a signal line 7a, one of the signal lines running through an address bus 7, are all connected to the address decoder 31. The address bus 7, the read enable signal line 8, a write enable signal line 9, a data bus 10 and a program power supply line 11 are all connected to both of the memory semiconductor elements 2 and 3. The memory semiconductor element 2 is connected to the address decoder 31 by a chip enable signal line 12. Similarly, the memory semiconductor element 3 is connected to the address decoder 31 by another chip enable signal line 13. The card enable signal line 6, the read enable signal line 8 and the write enable signal line 9 are pulled-up to power voltages by resistors 16, 17 and 18, respectively.

The IC card has a command decoder 4 to which the card enable signal line 6, the write enable signal line 9, the data bus 10 and the power supply line 11 are all connected. The output 14 of the command decoder 4 is connected to a latch circuit 5, having an output 15 connected to the address decoder 31. The write enable signal line 9 is connected to the latch circuit 5. The command decoder 4 and the latch circuit 5 form a means for inhibiting decoding.

Figure 3:
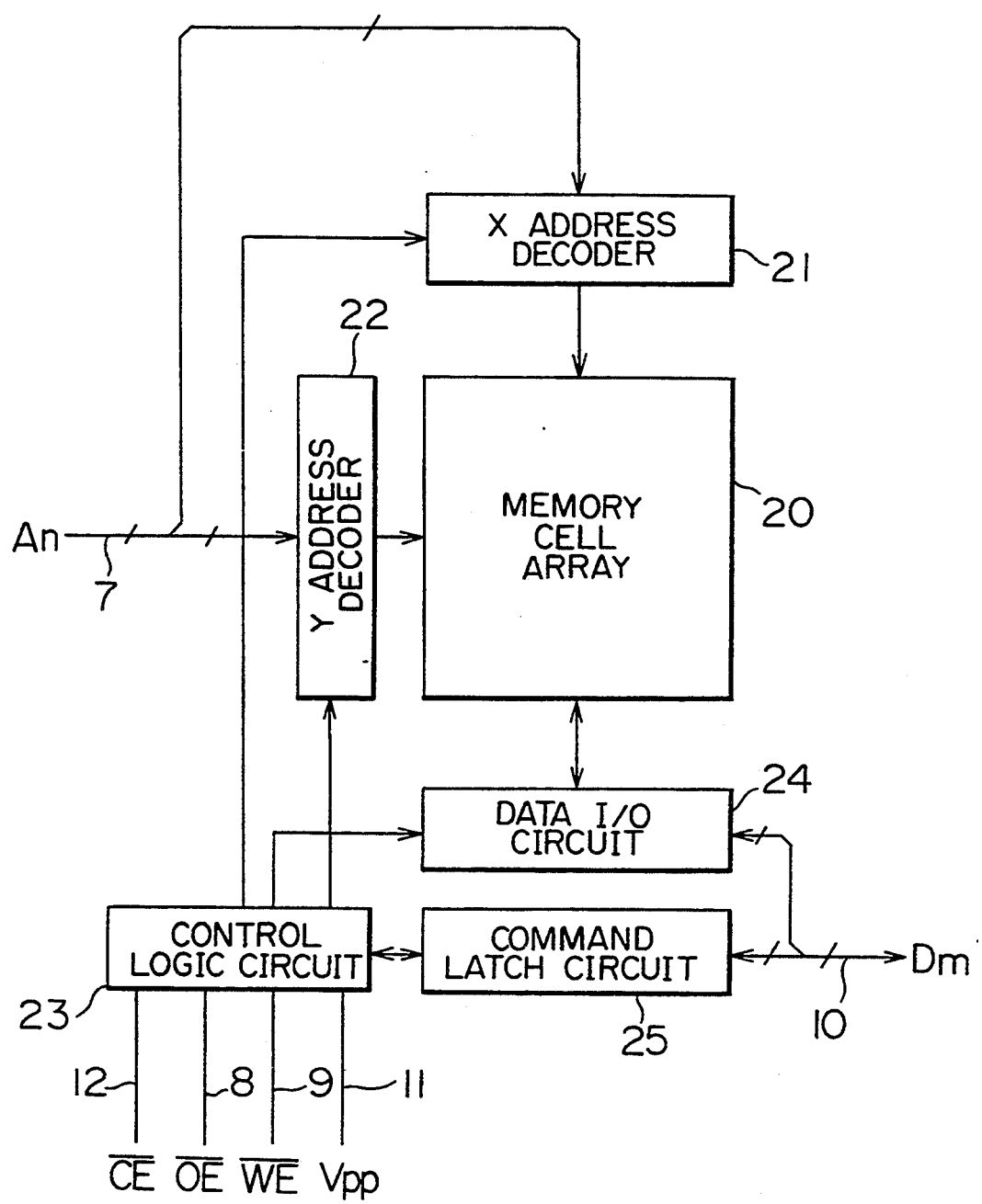
FIG. 3 is a circuit diagram showing the inner structure of a memory semiconductor element used in this invention.

The memory semiconductor elements 2 and 3 each have an inner structure similar to that shown in FIG. 3.

The command decoder 4 decodes data input to the data bus 10 when the level of the card enable signal line 6 and that of the write enable signal line 9 are both low and when a program voltage is applied to the program voltage line 11. The command decoder 4 makes the level of the output 14 high when the decoded data contains a specific code indicating batch erasure.

The latch circuit 5 latches the output of the command decoder 4 at the leading edge of the write enable signal line 9, and transmits this output.

The address decoder 31 enters an ordinary operating mode not only when the level of the output 15 of the latch circuit 5 is low, but also when the level of the output 15 is high and that of the read enable signal line 8 is low. The address decoder 31 then selects either of the memory semiconductor elements 2 or 3 on the basis of address signals input through the signal line 7a. It outputs a card enable signal, which is input through the card enable signal line 6, to the chip enable signal line 12 or 13 as a chip enable signal. On the other hand, when the level of the output 15 of the latch circuit 5 and that of the read enable signal line 8 are both high, the address decoder 31 directly outputs the card enable signal to both of the chip enable signal lines 12 and 13 as a chip enable signal, regardless of the address signals. In other words, at this time the address decoder 31 is inhibited from its decoding operation.

Figure 2:
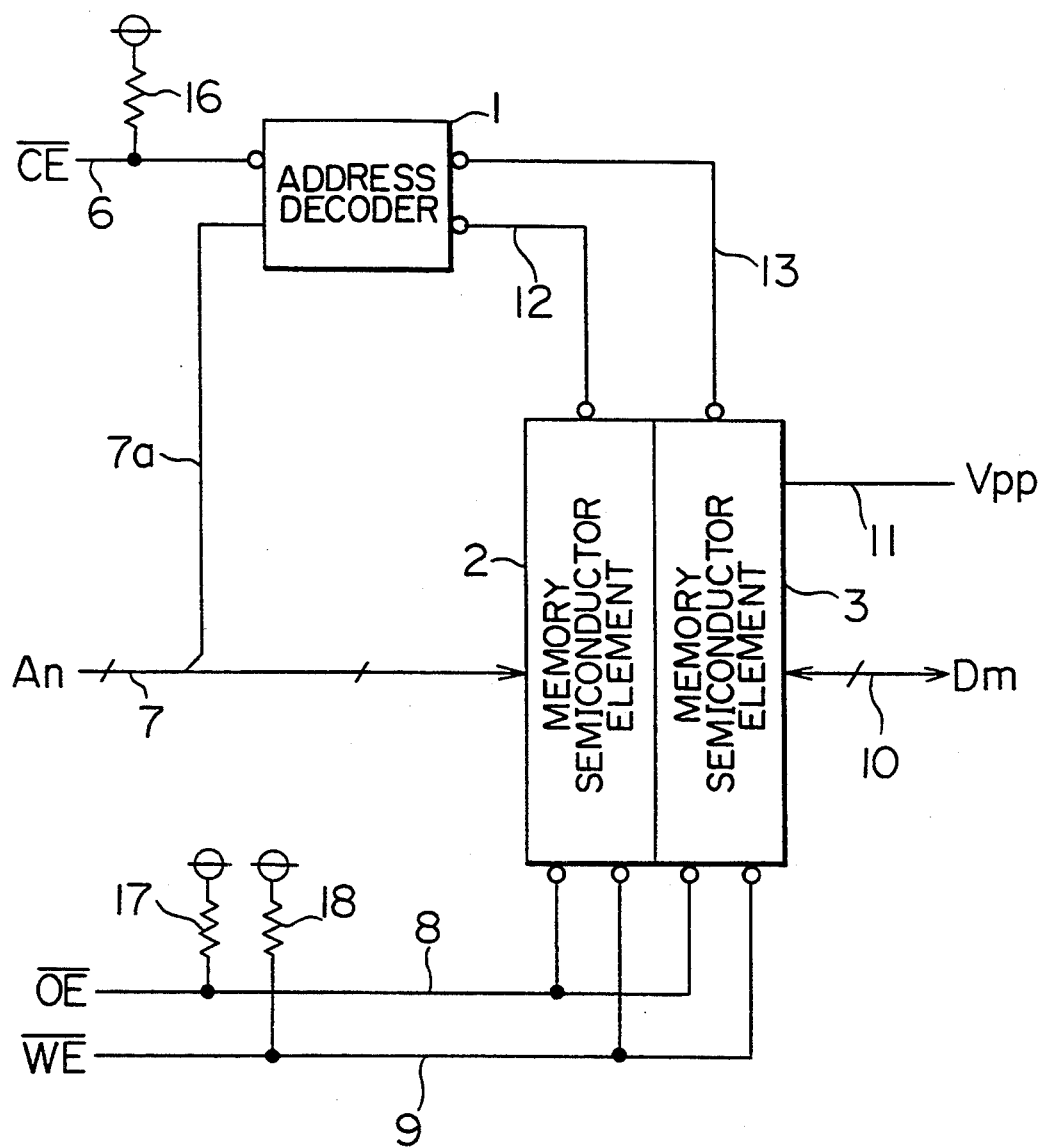
FIG. 2 is a block diagram showing the structure of the circuitry of a conventional IC card.

The operation of the IC card will now be described. To perform reading or writing, a read or a write command is input through the data bus 10. The command decoder 4 will not make the level of output 14 high with respect to the read or write command. In other words, since the level of the output 15 of the latch circuit 5 remains low, the address decoder 31 is in the ordinary operating mode and selects either of the memory semiconductor elements 2 or 3 on the basis of the address signal. Thus the IC card is capable of reading data as well as writing data in the same manner as the conventional IC card, shown in FIG. 2.

To perform batch erasure, the program voltage is applied to the program power supply line 11, and at the same time, the level of the card enable signal line 6 and that of the write enable signal line 9 are both made low, whereas the level of the read enable signal line 8 is made high. Under these conditions, data containing the specific code that indicates batch erasure is input through the data bus 10. As a result, the command decoder 4 makes the level of output 14 high, thus inputting an H-level signal to the address decoder 31 via the latch circuit 5. At this stage, because the level of the read enable signal line 8 is also high, the address decoder 31 enters a decode inhibiting mode, thus outputting a low level chip enable signal to both of the chip enable signal lines 12 and 13. The memory semiconductor elements 2 and 3 both become active, thereby simultaneously batch-erasing the contents stored in the memory semiconductor elements 2 and 3.

Then, the level of the card enable signal line 6 and that of the read enable signal line 8 are both made low, whereas the level of the write enable signal line 9 is made high. The batch erasure is verified. At this stage, because the level of the output 15 of the latch circuit 5 remains high, the address decoder 31 enters the ordinary operating mode, and selects either of the memory semiconductor elements 2 or 3 on the basis of the address signal. The batch erasure can thus be verified normally.

In the above embodiment, although an IC card having two built-in memory semiconductor elements 2 and 3 has been described, the same advantages as those described above are obtainable with an IC card having three or more built-in memory semiconductor elements.

Though the memory semiconductor elements 2 and 3 use two supply voltages, a normal supply voltage and a program voltage, a memory semiconductor element operated on a single power supply may also be employed so long as the operating modes of this element are determined by an input command.

The operating mode of the memory semiconductor element is not limited to reading, writing and batch-erasing modes, but may include other modes such as a partial-erasing mode.

What is claimed is:

1. An IC card comprising:

a plurality of semiconductor memory elements having operating modes determined by commands input from outside the IC card for electrically storing data in and erasing stored data from said plurality of semiconductor memory elements;

an address decoder for decoding a card signal in response to an address signal to selectively output a chip enable signal to one of said plurality of semiconductor memory elements; and decode inhibiting means for inhibiting said address decoder from decoding a card signal when a predetermined command is input from outside the IC card and a card enable signal is simultaneously supplied as the chip enable signal to all of said semiconductor memory elements, all data stored in all of said plurality of semiconductor memory elements being simultaneously erased in response to the predetermined command, wherein said address decoder includes a decode inhibiting signal input terminal and supplies the card enable signal as the chip enable signal to all of said semiconductor memory elements when a decode inhibiting signal is input to said decode inhibiting signal input terminal, and said decode inhibiting means includes a command decoder for decoding commands input from outside the IC card and for outputting the decode inhibiting signal in response to the predetermined command and a latch circuit for latching the decode inhibiting signal from said command decoder and outputting the decode inhibiting signal to said decode inhibiting signal input terminal of said address decoder.

2. The IC card as claimed in claim 1 wherein said command decoder outputs the decode inhibiting signal in response to a batch erasure command.

3. The IC card as claimed in claim 1 wherein said latch circuit latches the output of said command decoder at a leading edge of a write enable signal.

4. An IC card comprising:

a data bus for receiving data signals input from outside the IC card;

an address bus for receiving address signals input from outside the IC card;

an address decoder connected to the address bus and having a plurality of output terminals for decoding the address signals input from outside the IC card and for selectively outputting a plurality of chip enable signals on respective output terminals;

a card enable terminal for receiving a card enable signal from outside the IC card for activating the IC card;

a write enable terminal for receiving a write enable signal from outside the IC card for writing data into at least one of a plurality of semiconductor memory elements;

a read enable terminal for receiving a read enable signal from outside the IC card for reading stored data from at least one of the plurality of semiconductor memory elements;

the plurality of semiconductor memory elements being disposed on the IC card and connected to the data bus, each of the plurality of semiconductor memory elements including a chip enable signal line connected to a corresponding output terminal, a read enable port connected to the read enable terminal, and a write enable port connected to the write enable terminal;

a command decoder connected to the data bus, the card enable terminal, the write enable terminal, and the read enable terminal and responsive to a combination of signals applied to the data bus, the card enable terminal, the write enable terminal, and the read enable terminal to output a batch-erasure signal for erasing all data stored in all of the semiconductor memory elements; and a latch circuit connected to the command decoder, the write enable terminal, and the address decoder and responsive to the batch-erasure signal for batch-erasing all of the semiconductor memory elements.

5. The IC card of claim 4 including a power supply terminal connected to the plurality of semiconductor memory elements wherein the command decoder is connected to and responds to a programming voltage applied to the power supply terminal in generating the batch-erasure signal.

* * * * *